(12) United States Patent
Fukuda

(10) Patent No.: US 7,012,199 B2
(45) Date of Patent: Mar. 14, 2006

(54) COORDINATES CORRECTION APPARATUS, COORDINATES CORRECTION PARAMETER CALCULATION APPARATUS, COORDINATES CORRECTION METHOD, COORDINATES CORRECTION PARAMETER CALCULATION METHOD, MEMORY MEDIUM FOR STORING COORDINATES CORRECTION CONTROL PROGRAM, AND MEMORY MEDIUM FOR STORING COORDINATES CORRECTION PARAMETER CALCULATION PROGRAM

(75) Inventor: Ryoji Fukuda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/454,969

(22) Filed: Dec. 6, 1999

(65) Prior Publication Data

US 2003/0056999 A1 Mar. 27, 2003

(30) Foreign Application Priority Data

| Dec. 4, 1998 | (JP) | ............................................ | 10-344964 |
| Dec. 25, 1998 | (JP) | ............................................ | 10-368317 |
| Dec. 25, 1998 | (JP) | ............................................ | 10-368318 |
| Nov. 18, 1999 | (JP) | ............................................ | 11-328426 |

(51) Int. Cl.
G08C 21/00 (2006.01)

(52) U.S. Cl. ..................... 178/18.02; 345/157; 345/158; 345/162; 345/174; 345/175; 345/179; 178/18.01; 178/18.03; 382/291; 382/294; 382/295; 396/188

(58) Field of Classification Search ................. 345/157, 345/158, 162, 174, 175, 179; 382/291, 294, 382/295; 396/188; 178/18.02, 18.01, 18.03
See application file for complete search history.

(56) References Cited

U.S. PATENT DOCUMENTS

| 4,650,926 | A | * | 3/1987 | Nakamura | .................... | 178/18 |
| 5,113,251 | A | * | 5/1992 | Ichiyanagi et al. | ............ | 358/75 |
| 5,425,109 | A | * | 6/1995 | Saga et al. | .................. | 382/187 |
| 5,621,438 | A | * | 4/1997 | Kamimura et al. | ......... | 345/178 |
| 5,777,898 | A | * | 7/1998 | Teterwak | ..................... | 702/95 |
| 5,940,064 | A | * | 8/1999 | Kai et al. | .................... | 345/173 |

(Continued)

FOREIGN PATENT DOCUMENTS

| JP | 2517664 | 8/1990 |
| JP | 5-313822 | 11/1993 |
| JP | 8-171451 | 7/1996 |

*Primary Examiner*—Xiao Wu
*Assistant Examiner*—Abbas Abdulselam
(74) *Attorney, Agent, or Firm*—Fitzpatrick, Cella, Harper & Scinto

(57) ABSTRACT

Correction of coordinates input by a user through an input device is effected using coordinate correction parameters. To calculate the coordinate correction parameters, a plurality of reference points are displayed on the input device. Coordinate input is designated by a user, and if the coordinate is determined to correspond to a reference point, then the coordinate input is retained. The process is repeated until a coordinate is kept for each reference point, wherein only remaining reference point(s) for which a corresponding coordinate has not yet been retained are displayed. Once coordinates have been input for the reference points, a correspondence between coordinate input and a reference point is determined, and corresponding coordinates are kept for each reference point. Using correction parameters calculated based on the kept coordinates, it is possible to correct device characteristics of the input device such as position aberration, even if such characteristics are non-linear.

34 Claims, 9 Drawing Sheets

U.S. PATENT DOCUMENTS

| | | | | |
|---|---|---|---|---|
| 5,940,065 A | * | 8/1999 | Babb et al. | 345/178 |
| 5,963,194 A | * | 10/1999 | Umeda et al. | 345/157 |
| 6,016,140 A | * | 1/2000 | Blouin et al. | 345/178 |
| 6,077,310 A | * | 6/2000 | Yamamoto et al. | 716/19 |
| 6,133,905 A | * | 10/2000 | Edo et al. | 345/156 |
| 6,195,068 B1 | * | 2/2001 | Suzuki et al. | 345/2.2 |
| 6,229,529 B1 | * | 5/2001 | Yano et al. | 345/175 |
| 6,320,614 B1 | * | 11/2001 | Kawashima | 348/211.29 |
| 6,339,748 B1 | * | 1/2002 | Hiramatsu | 702/159 |

* cited by examiner

COORDINATES CORRECTION APPARATUS, COORDINATES CORRECTION PARAMETER CALCULATION APPARATUS, COORDINATES CORRECTION METHOD, COORDINATES CORRECTION PARAMETER CALCULATION METHOD, MEMORY MEDIUM FOR STORING COORDINATES CORRECTION CONTROL PROGRAM, AND MEMORY MEDIUM FOR STORING COORDINATES CORRECTION PARAMETER CALCULATION PROGRAM

BACKGROUND OF THE INVENTION

1. Field of the Invention

The present invention relates to a coordinates correction apparatus including a coordinates input area for correcting the received coordinates of a location optionally indicated on the coordinates input area, a coordinates correction method, and a memory medium that can be read by a computer storing a control program for the coordinates correction process.

The present invention also relates to a coordinates correction parameter calculation apparatus for calculating coordinates correction parameters for correcting the coordinates of a location optionally indicated on the coordinates input area, a coordinates correction parameter calculation method, and a memory medium that can be read by a computer storing a program for performing coordinates correction parameter calculation.

2. Related Background Art

Conventionally, for correction of input coordinates in coordinates input apparatuses, a method has been employed in which coordinates correction parameters are calculated by solving simultaneous equations expressed by linear conversion from the raw coordinate values obtained from several locations used as reference points on the coordinates input area of the coordinates input apparatus, substituting the input coordinates into the linear conversion formulas, as shown in Japanese Patent Application Laid-Open Nos. 5-313822 and 8-171451 and Japanese Patent No. 2,517,664.

Such a correction parameter calculation method is described below. First, two reference points $(X_0, Y_0)$ and $(X_1, Y_1)$ are set on the coordinates input area of the coordinates input apparatus and the position of those reference points are indicated with a mark. These indicators are displayed on a display apparatus such as a liquid crystal display installed under a transparent coordinates input area, for example. Next, raw coordinates data for two points are input from a coordinates input apparatus when the user points to the position at which the user sees the marks by eye (for example using an indication tool for coordinates input in the form of a pen). The input raw coordinates data $(x_{nw}, y_{nw})$ and $(x_{se}, y_{se})$ will form the following relationship with the original coordinates of the two standard points.

$$X_0 = ax_{nw} + b \quad \text{[Equation 1]}$$
$$Y_0 = cy_{nw} + d$$
$$X_1 = ax_{se} + b$$
$$Y_1 = cy_{se} + d$$

(a, b, c, and d are constants)

Correction parameters a, b, c, and d are found from the formulas as follows.

$$a = \frac{X_1 - X_0}{x_{se} - x_{nw}} \quad \text{[Equation 2]}$$
$$b = \frac{X_0 x_{se} - X_1 x_{nw}}{x_{se} - x_{nw}}$$
$$c = \frac{Y_1 - Y_0}{y_{se} - y_{nw}}$$
$$d = \frac{Y_0 y_{se} - Y_1 y_{nw}}{y_{se} - y_{nw}}$$

Calculating the parameters as above and using them for correction of the input coordinates is effective when the coordinates detection characteristic of the coordinates input apparatus is parallel to the X-axis and the Y-axis. However, in general there is often in incline with respect to the axis. Thus, a correction method was also conceived of using three reference points $(X_0, Y_0)$, $(X_1, Y_1)$ and $(X_2, Y_2)$ where the relationship between the raw coordinates data is as follows:

$$X_0 = ax_{nw} + by_{nw} + c \quad \text{[Equation 3]}$$
$$Y_0 = dx_{nw} + ey_{nw} + f$$
$$X_1 = ax_{se} + by_{se} + c$$
$$Y_1 = dx_{se} + ey_{se} + f$$
$$X_2 = ax_{ne} + by_{ne} + c$$
$$Y_2 = dx_{ne} + ey_{ne} + f$$

(a, b, c, d, e, and f are constants)

The correction parameters a, b, c, d, e, and f are found from the following formulas.

$$a = \frac{(X_2 - X_0)(y_{se} - y_{nw}) - (X_1 - X_0)(y_{ne} - y_{nw})}{(x_{ne} - x_{nw})(y_{se} - y_{nw}) - (x_{se} - x_{nw})(y_{ne} - y_{nw})} \quad \text{[Equation 4]}$$
$$b = \frac{(X_2 - X_0)(x_{se} - x_{nw}) - (X_1 - X_0)(x_{ne} - x_{nw})}{(y_{ne} - y_{nw})(x_{se} - x_{nw}) - (y_{se} - y_{nw})(x_{ne} - x_{nw})}$$
$$c = X_0 - ax_{nw} - by_{nw}$$
$$d = \frac{(Y_2 - Y_0)(y_{se} - y_{nw}) - (Y_1 - Y_0)(y_{ne} - y_{nw})}{(x_{ne} - x_{nw})(y_{se} - y_{nw}) - (x_{se} - x_{nw})(y_{ne} - y_{nw})}$$
$$e = \frac{(Y_2 - Y_0)(x_{se} - x_{nw}) - (Y_1 - Y_0)(x_{ne} - x_{nw})}{(y_{ne} - y_{nw})(x_{se} - x_{nw}) - (y_{se} - y_{nw})(x_{ne} - x_{nw})}$$
$$f = Y_0 - dx_{nw} - ey_{nw}$$

When these coordinates correction parameters are established, the input coordinates are corrected based on the formulas below, and output to, for example, a liquid crystal display serving as a coordinates output means.

After finding the correction parameters, when the coordinates are actually input, the correction formulas are expressed as:

$$X = ax + b$$
$$Y = cx + d$$

using the correction parameters a, b, c, and d when there are two reference points in the correction method using two reference points. When using the correction method having three reference points, the formulas are expressed:

$$X = ax + by = C$$
$$Y = dx + ey + f$$

using correction parameters a, b, c, d, e, and f.

Further, in Japanese Patent Application Laid-Open No. 8-171451, in order to compensate for the nonlinear characteristic of the coordinates input apparatus, an embodiment is disclosed in which the territory is finely divided by 20 reference points and the correction parameters are sought for each territory through the method of seeking the correction parameters with three reference points.

SUMMARY OF THE INVENTION

There is a so-called resistance membrane type coordinates input apparatus in which the coordinates input area comprises a resistance membrane and the input coordinates of a position indicated on the coordinates input area are detected by the voltage responding to the resistance of the resistance membrane. In these types of coordinates input apparatuses, the resistance member within the resistance membranes on the market are sometimes not vaporized uniformly and linearity between the input coordinates and the voltage detected from the resistance membrane may not be found.

In an apparatus comprising a coordinates input part using such a resistance membrane, the electrical detection characteristic of the input coordinates becomes nonlinear, and discrepancies in the input coordinates particularly at the outer periphery of the coordinates input area become striking.

Given the parts of such a coordinates input part, the coordinates correction method using two or three reference points for the above conventional coordinates input apparatuses cannot be applied, and only a method such as in Japanese Patent Application Laid-Open No. 8-171451 can be performed. However, with this method, one must either set many reference points or it is necessary to keep many correction parameters or an operation for determining territories is necessary. These problems can of course be mentioned in relation to correction of input coordinates in other types of coordinates input apparatuses other than resistance membrane types as well.

Thus, the aim of the present invention is to be able to perform coordinates input with high precision even when the electrical characteristic relating to coordinates detection of the coordinates input part is not linear by performing correction of input coordinates accurately in response to such nonlinearity.

The present invention is a coordinates correction apparatus including a parameter keeping means for keeping quadratic nonlinear conversion constants as coordinates correction parameters, a coordinates correction method, and a memory medium storing a coordinates correction control program which receives coordinates of locations optionally indicated on a coordinates input area and corrects the received coordinates by a coordinate reception step by quadratic nonlinear conversion using the coordinates correction parameters kept in the parameter keeping means.

Preferably, the present invention further comprises a parameter calculation step for calculating the coordinates correction parameters for nonlinear conversion and keeping the coordinates correction parameters by the parameter keeping means.

The present invention is further a coordinates correction parameter calculation apparatus including a coordinates input area for calculating the coordinates correction parameters for correcting the coordinates of locations optionally indicated on a coordinates input area by nonlinear conversion, a coordinates correction parameter calculation method, and a memory medium storing a coordinates correction parameter calculation program which receives from the coordinates input apparatus coordinates of indicated locations corresponding to multiple reference points with differing locations established on the coordinates input area and calculates the nonlinear equation type coordinates correction parameters for coordinates correction by solving the simultaneous equations by applying the received coordinates to the nonlinear equations for coordinates correction.

In the embodiments to be described below, in such a coordinates correction apparatus, a coordinates correction method, and a memory medium that can be read by a computer storing a control program for coordinates correction processing, even if the coordinates detection characteristic is not linear due to the quality of the parts of the coordinates input part of the coordinates input apparatus or such, in response to this accurate correction of the input coordinates and highly precise coordinates input can be performed because secondary nonlinear conversion constants are kept as parameters for correcting the input coordinates and the input coordinates are corrected by secondary nonlinear conversion using these parameters.

Further, even if the electrical characteristic relating to the coordinates detection of the coordinates input apparatus is nonlinear, calculation of coordinates correction parameters for performing correction of the input coordinates can be performed with high precision simply and with low construction costs and the manufacturing costs of the coordinates input apparatus for performing correction of the input coordinates using coordinates correction parameters calculated in this way can be reduced.

Further, coordinates correction parameters in the form of nonlinear conversion correction formula constants can be calculated based on simple coordinates input merely by indicating four reference points established on the coordinates input area.

Further, by performing correction of the input coordinates with nonlinear conversion correction formulas using the calculated coordinates correction parameters, even if the electrical characteristic relating to the coordinates detection of the coordinates input part is not linear, accurate correction can be performed corresponding to the input from the user and coordinates input can be performed with high precision. Further, the manufacturing costs of the apparatus can be reduced.

Other aims and benefits of the present invention will become clear from the detailed description, attached Figures, and the Claims to follow.

DETAILED DESCRIPTION OF THE PREFERRED EMBODIMENTS

Following, several embodiments of the present invention are described.

[Embodiment 1]

Figure 1:
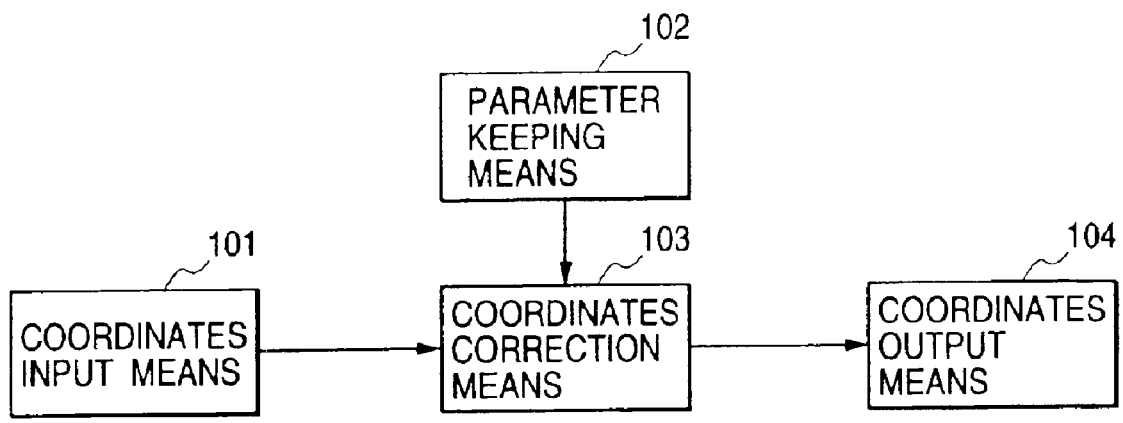
FIG. 1 is a block diagram showing the basic construction of the fist embodiment of the present invention.

FIG. 1 shows the basic construction of the coordinates input apparatus according to the first embodiment of the present invention.

As shown here, the apparatus of the present embodiment includes a coordinates input means 101, a parameter keeping means 102, a coordinates correction means 103, and a coordinates output means 104.

The coordinates input means 101 includes a coordinates input area and coordinates of locations optionally indicated on the coordinates input area are detected and input. The parameter keeping means 102 keeps parameters for correcting the values of the input coordinates. Using the parameters kept in the parameter keeping means, the coordinates correction means 103 corrects the values of the coordinates input by the coordinates input means 101. The coordinates output means 104 outputs the coordinates corrected by the coordinates correction means 103.

Here, as the particular characteristic of the present invention, quadratic nonlinear conversion constants are kept as parameters for correction in the parameter keeping means 102 and the coordinates correction means 103 corrects the input coordinates by performing secondary nonlinear conversion based on these constants and outputs to the coordinates output means 104.

Next, the actual construction of the hardware of the apparatus of the present embodiment is described with reference to FIG. 3.

Figure 3:
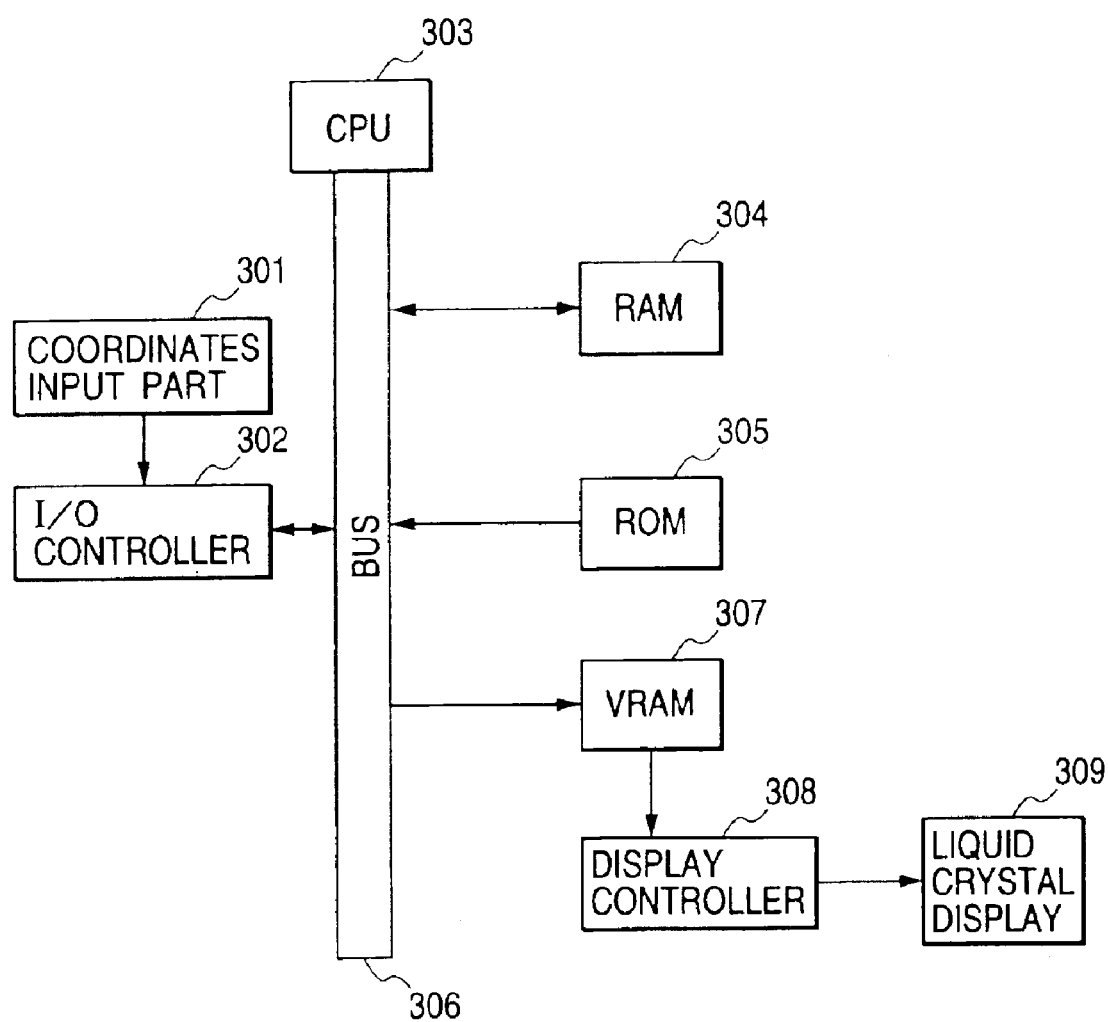
FIG. 3 is a block diagram showing the construction of the actual hardware of the first embodiment.

In FIG. 3, 301 is a coordinates input part which serves as the coordinates input means 101 of FIG. 1 constructed, for example, of the resistance membrane type described above, comprising (not illustrated) a transparent resistance membrane which forms the coordinates input area, a drive circuit for reading the coordinates of a position on the resistance membrane indicated by a coordinates input indication tool in pen form by voltage, and an A/D conversion circuit for A/D conversion of the read output into coordinates data.

The input coordinates data detected in the coordinates input part 301 are transferred to the I/O controller 302. The I/O controller 302 sends the coordinates data to a bus 306 and a CPU 303 following orders from the CPU 303.

As well as controlling the entire apparatus, the CPU 303 fulfills the roll of the coordinates correction means of FIG. 1 and performs correction of the coordinates. The details of that process will be described in detail later. Within the CPU 303, RAM 304, ROM 305, and VRAM 307 memories are connected via the bus 306.

RAM 304 is used as the work area of the CPU 303.

ROM 305 fulfills the role of the parameter keeping means 102 of FIG. 1, with secondary nonlinear conversion constants (to be given later) written in designated areas in advance as the parameters for correcting the input coordinates. There are solid-state differences to each of the coordinates input parts 301 and it is necessary to perform a correction on each of the coordinates input parts 301 loaded on each coordinates input apparatus at time of shipment from the factory. At that time, the individual coordinates correction parameters for each unit are decided as a result of the correction and written on the loaded ROM 305 of the apparatus.

Further, a control program executed by the CPU 303 for control is written on the ROM 305. A program for performing the aforementioned coordinates correction process is included in this control program. The CPU 303 fulfills the role of coordinates correction means 103 by executing this program.

The ROM 305 corresponds to the embodiment of the memory medium that can be read by the computer for storing the control program for coordinates correction in the present invention.

The VRAM 307 keeps display data written in from the CPU 303 and displays it on a liquid crystal display 309 controlled by a display controller 308. Input coordinates data corrected by the CPU 303 acting as the coordinates correction means 103 are included in this display data. In other words, VRAM 307, the display controller 308, and the liquid crystal display 309 comprise the coordinates output means 104 of FIG. 1 and display and output the corrected input coordinates.

The liquid crystal display 309 is placed underneath the coordinates input area constructed from a transparent resistance membrane of the coordinates input part 301.

Figure 2:
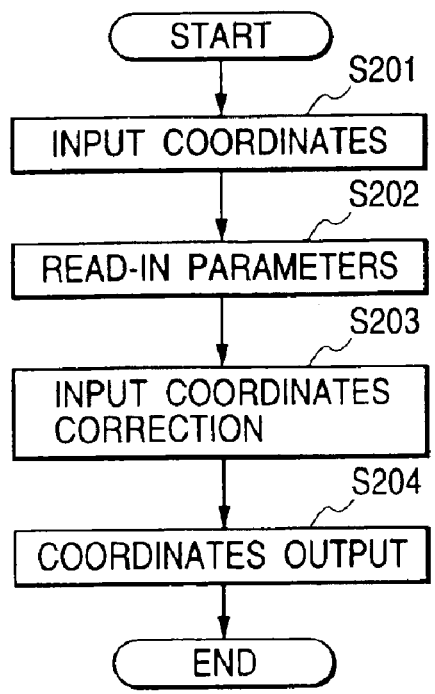
FIG. 2 is a flowchart showing the procedure of the coordinates correction process of the first embodiment.

Next, the operation of the correction process for input coordinates by the CPU 303 functioning as the coordinates correction means 103 is described using the flowchart of FIG. 2. The control program for the correction process corresponding to this flowchart is stored on ROM 305 and executed by the CPU 303.

First, coordinates input is performed by the coordinates input part 301 in step S201. The coordinates obtained here are (x, y).

Next, the coordinates correction parameters are read-in from ROM 305 in step S202. The parameters read-in here are quadratic nonlinear conversion constants:

xy constant a for correction of the x coordinate,
x constant b for correction of the x coordinate,
y constant c for correction of the x coordinate,
constant d for correction of the x coordinate,
xy constant e for correction of the y coordinate,
x constant f for correction of the y coordinate,
y constant g for correction of the y coordinate, and
constant h for correction of the y coordinate.

Next, correction of the input coordinates (x, y) is performed in step S203. If the corrected coordinates here are (X, Y), the correction formula is expressed as the quadratic nonlinear conversion formulas:

$$X = axy + bx + cy + d$$

$$Y = exy + fx + gy + h$$

Finally, the corrected coordinates (X, Y) are sent to VRAM 307 and displayed on the liquid crystal display 309 in step S204.

As above, because in the first embodiment correction of the input coordinates is performed by secondary nonlinear conversion if the electrical characteristic relating to the coordinates detection of the coordinates input part of the coordinates input apparatus is not linear the input coordinates can be accurately corrected in response to this and highly precise coordinates input can be performed.

In the first embodiment the control program of the parameters for correcting the input coordinates and for the correction process was stored in ROM 305, but it can also be stored in a memory medium that can be read by another computer, such as a disk or memory card, and can be used by reading-in to RAM 304 from the memory medium.

[Embodiment 2]

In the first embodiment, the coordinates correction parameters are mentioned in connection with the coordinates input apparatus as written on the ROM 305 in advance, but in the second embodiment a coordinates correction parameter calculation apparatus for calculating coordinates correction parameters is described.

Figure 4:
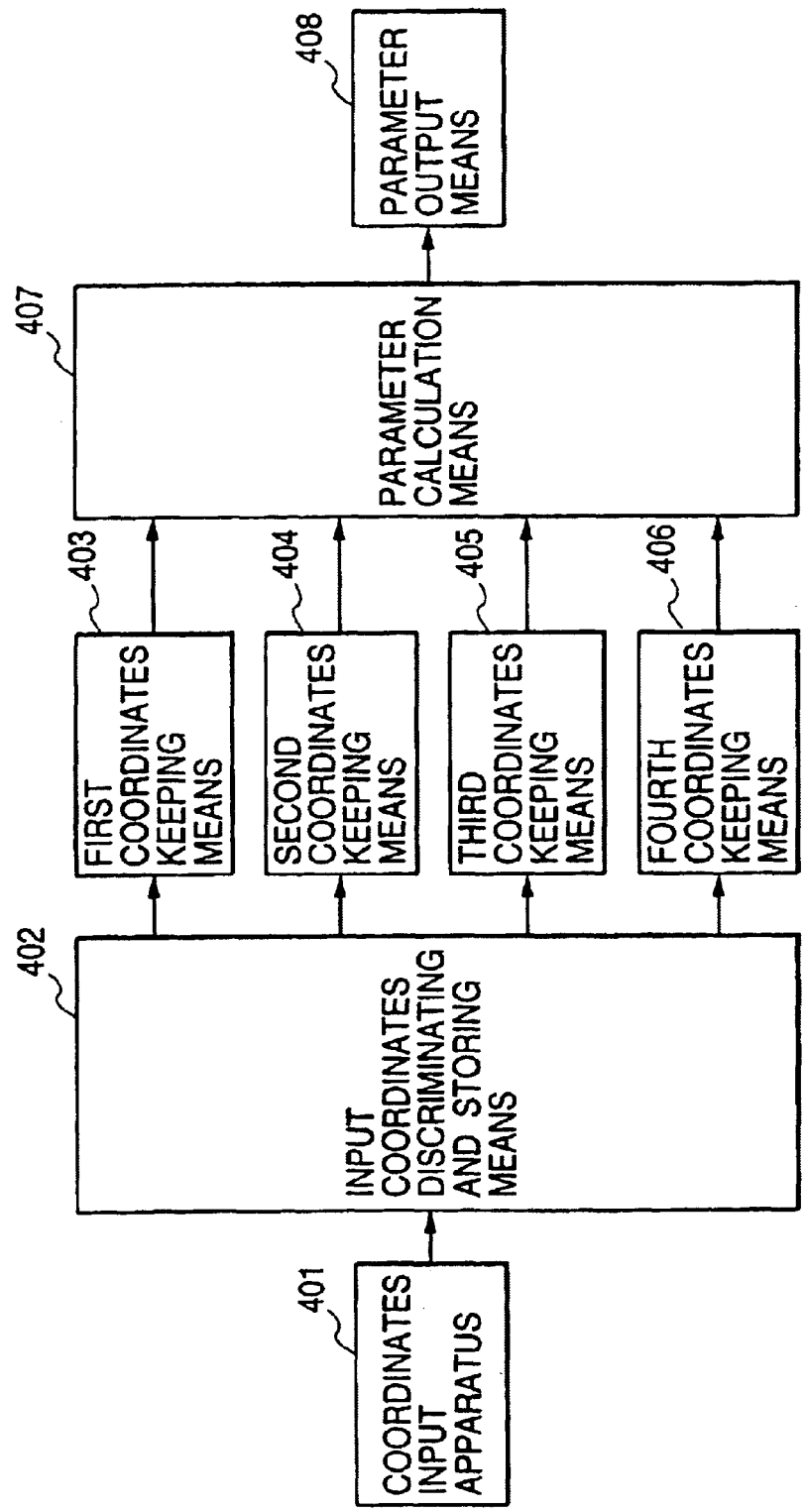
FIG. 4 is a block diagram showing the basic construction of the second embodiment of the present invention.

The basic functional structure of the coordinates correction parameter calculation apparatus of the second embodiment is described in FIG. 4. In FIG. 4 the coordinates correction parameter calculation apparatus is composed of means keyed 402 to 408 and the calculated coordinates correction parameters are set in a coordinates input apparatus 401.

In the present embodiment, in order to calculate the coordinates correction parameters for correcting the input coordinates input from the coordinates input apparatus 401, a first through a fourth reference point with differing locations are displayed on the coordinates input area of the coordinates input apparatus 401 and four coordinates are input by indicating these reference points.

A first through a fourth coordinates keeping means 403 to 406 are installed corresponding one to one to the first through the fourth reference points in the coordinates correction parameter calculation apparatus. Further, an input coordinates discriminating and storing means 402 is installed which stores the four coordinates input from the coordinates input apparatus 401 by indicating a first through a fourth reference point as described above and discriminates the order of the reference points and divides them among the corresponding first through fourth coordinates keeping means 403 to 406. Further, a parameter calculation means 407 is installed which calculates the coordinates correction parameters by solving simultaneous equations based on the four coordinates stored in the first through the fourth coordinates keeping means 403 to 406 by the input coordinates discriminating and storing means 402 and sends them to the parameter output means 408. The parameter output means 408 outputs the parameters to the outside.

Figure 5:
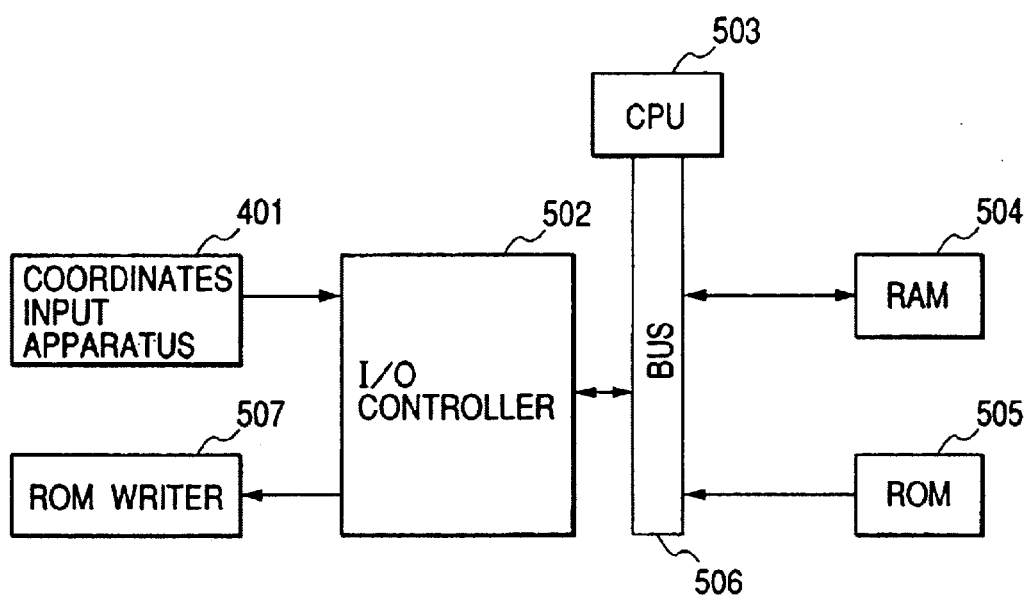
FIG. 5 is a block diagram showing the construction of the actual hardware of the second embodiment.

Next, the actual hardware of the coordinates correction parameter calculation apparatus is described in FIG. 5. In FIG. 5, the coordinates correction parameter calculation apparatus is constructed of elements keyed 502 to 507.

The coordinates input apparatus 401 is constructed of either an aforementioned resistance membrane type or another type of input apparatus. The coordinates data input from the coordinates input apparatus 401 is transferred to a CPU 503 via an I/O controller 502 and a bus 506. The I/O controller 502 performs data transmission for input of the coordinates data or output of coordinates correction parameters under the control of the CPU 503.

The I/O controller 502 is connected to RAM 504 and ROM 505 via the bus 506 in the CPU 503.

The CPU 503 fulfills the role of the input coordinates discriminating and storing means 402 and the parameter calculation means 407 of FIG. 4 as well as performing control of the coordinates correction parameter calculation apparatus as a whole by executing the control program stored in ROM 505. In other words, a program, to be described later, in which the CPU 503 executes the input coordinates discrimination and storing means 402 and the parameter calculation means 407 is included in the control program stored on ROM 505. ROM 505 corresponds to an embodiment of the memory medium that can be read by a computer storing a program for performing coordinates correction parameter calculation in the present invention.

RAM 504 fulfills the role of the first through fourth coordinates keeping means 403 to 406 of FIG. 4. In other words, a first through a fourth coordinates keeping area comprising multiple addresses for keeping coordinates data corresponding one to one to the first through the fourth reference points is established within RAM 504.

A ROM writer 507 is connected to the I/O controller 502. This ROM writer 507 corresponds to the parameter output means 408 of FIG. 4 and writes the coordinates correction parameters from the CPU 503 to be described later onto a ROM (not shown in the drawing). This unillustrated ROM is loaded on the coordinates input apparatus 401 after the coordinates correction parameters are written in and used for coordinates correction.

Figure 6:
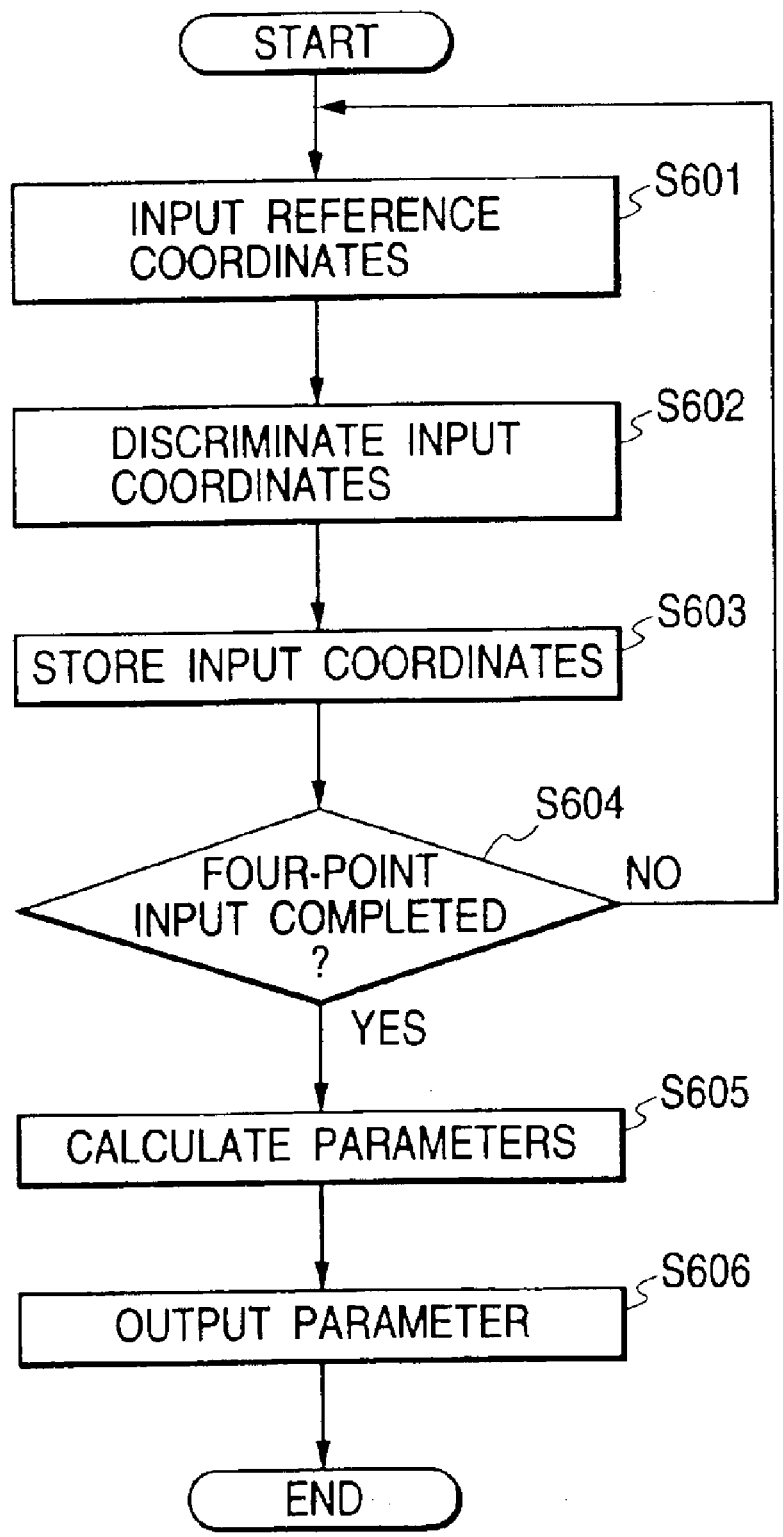
FIG. 6 is a flowchart showing the procedure of the coordinates correction process of the second embodiment.

Next, the operations of coordinates correction parameter calculation of the CPU 503 are described in the flowchart of FIG. 6. A program of the processing procedure corresponding to the flowchart of FIG. 6 is stored in ROM 505 and executed by the CPU 503.

First, four coordinates are input when the operator of the apparatus indicates a first through a fourth reference point with differing locations on the coordinates input area of the coordinates input apparatus 401 in the first step, S601.

Figure 7:
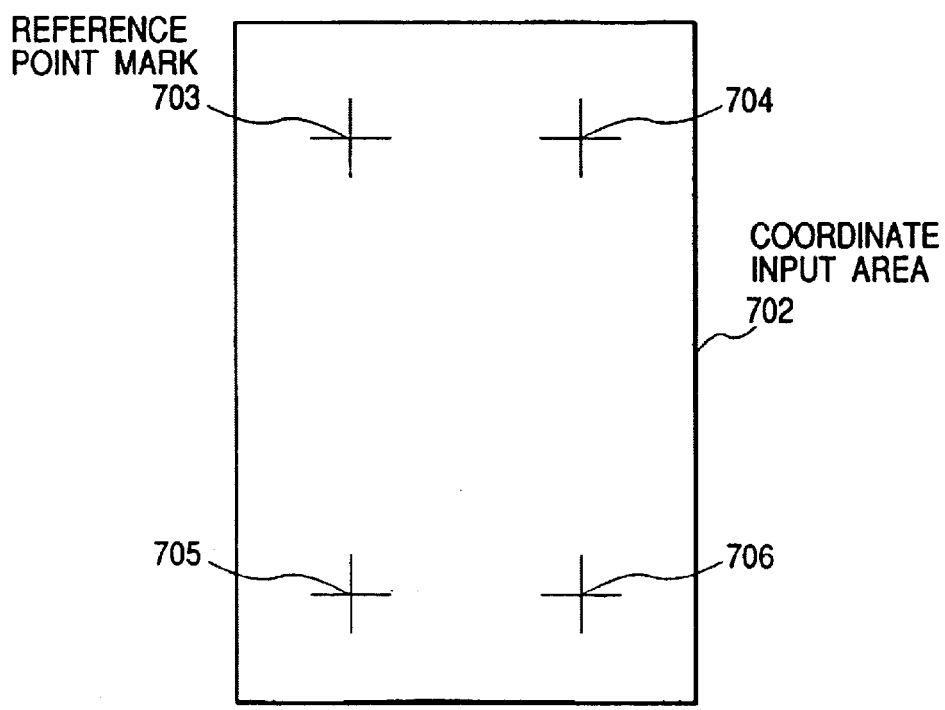
FIG. 7 is a drawing showing the appearance of the marks of the reference points displayed on the coordinates input screen in the second and third embodiments.

In order to do this, as shown in FIG. 7, four reference point marks 703 to 706 are displayed in advance on the coordinates input area 702 of the coordinates input apparatus indicating a first through a fourth reference point with differing locations and these points are indicated (contacted) by a coordinates input indication tool in the form of a pen, for example. The coordinates of the locations of these marks 703 to 706, or in other words the coordinates of the locations of the first through the fourth reference points, become the coordinates used for reference in parameter calculation, described below. Therefore, they should be established with a suitable distance between them such that rounding-off errors during calculation do not become too large. The coordinates of the locations of the reference point marks 703 to 706 are given here as $(X_0, Y_0)$, $(X_1, Y_0)$, $(X_0, Y_1)$, and $(X_1, Y_1)$ in order to simplify the calculations.

The display of these marks 703 to 706 is temporary. For example, the marks can be displayed if the material of the resistance membrane or such that comprises the coordinates input area 702 is transparent and layered on a display apparatus such as a liquid crystal display.

Next, it is determined which of the input coordinates before correction (x, y) indicated by the above indication corresponds to which of the reference points, the first through the fourth, represented by the reference point marks 703 to 706 in step S602. The distance between the input coordinates (x, y) and each of the first through the fourth reference point coordinates $(X_0, Y_0)$, $(X_1, Y_0)$, $(X_0, Y_1)$, and $(X_1, Y_1)$ is calculated, the distances are compared, and the reference point the shortest distance from the coordinates is the one entered.

Next, in step S603 the data of the input coordinates (x, y) is stored in the area corresponding to the reference point it was determined to correspond to in step S602, among the first through the fourth coordinates keeping areas in RAM 504.

Next, in step S604 it is determined whether or not coordinates input has been completed for all four reference point marks 703 to 706. Then, either steps S601 through S604 are repeated by returning to step S601 if input is not complete, or it advances to step S605 if input is complete.

The input coordinates corresponding to the four reference point marks 703 to 706 are given here as $(x_{nw}, y_{nw})$, $(x_{ne}, y_{ne})$, $(x_{sw}, y_{sw})$ and $(x_{se}, y_{se})$. The subscripts of each variable nw, ne, sw, and se stand for, respectively, northwest, northeast, southwest, and southeast. In other words, they express the direction of the reference points from the center of the coordinates input area of the coordinates in put apparatus when north is considered the upward direction.

In step S605, parameters for correction of the input coordinates are calculated by solving simultaneous equations based on the four coordinate, $(x_{nw}, y_{nw})$, $(x_{ne}, y_{ne})$, $(x_{sw}, y_{sw})$, and $(x_{se}, y_{se})$ stored in the first through the fourth coordinates keeping areas in RAM 504 input as above.

The formulas below are the simultaneous equations based on the four coordinates. As for the basic correction formula for coordinates correction, if the corrected coordinates are (X, Y), then in a nonlinear conversion formula including the quadratic term(xy) (where a, b, c, d, e, f, g, and h are constants):

$$X = axy + bx + cy + d$$

$$Y = exy + fx + gy + h$$

When the input coordinates of the four reference points above are applied to these formulas, the following simultaneous equations are formed:

$$X_0 = ax_{nw}y_{nw} + bx_{nw} + cy_{nw} + d \quad \text{[Equation 5]}$$
$$Y_0 = ex_{nw}y_{nw} + fx_{nw} + gy_{nw} + h$$
$$X_1 = ax_{ne}y_{ne} + bx_{ne} + cy_{ne} + d$$
$$Y_0 = ex_{ne}y_{ne} + fx_{ne} + gy_{ne} + h$$
$$X_0 = ax_{sw}y_{sw} + bx_{sw} + cy_{sw} + d$$
$$Y_1 = ex_{sw}y_{sw} + fx_{sw} + gy_{sw} + h$$
$$X_1 = ax_{se}y_{se} + bx_{se} + cy_{se} + d$$
$$Y_1 = ex_{se}y_{se} + fx_{se} + gy_{se} + h$$

Solving these equations, the following are expressed as functions:

$$a = A(X_0, X_1, x_{nw}, y_{nw}, x_{ne}, y_{ne}, x_{sw}, y_{sw}, x_{se}, y_{se}) \quad \text{[Equation 6]}$$
$$b = B(X_0, X_1, x_{nw}, y_{nw}, x_{ne}, y_{ne}, x_{sw}, y_{sw}, x_{se}, y_{se})$$
$$c = C(X_0, X_1, x_{nw}, y_{nw}, x_{ne}, y_{ne}, x_{sw}, y_{sw}, x_{se}, y_{se})$$
$$d = D(X_0, X_1, x_{nw}, y_{nw}, x_{ne}, y_{ne}, x_{sw}, y_{sw}, x_{se}, y_{se})$$
$$e = E(X_0, X_1, x_{nw}, y_{nw}, x_{ne}, y_{ne}, x_{sw}, y_{sw}, x_{se}, y_{se})$$
$$f = F(X_0, X_1, x_{nw}, y_{nw}, x_{ne}, y_{ne}, x_{sw}, y_{sw}, x_{se}, y_{se})$$
$$g = G(X_0, X_1, x_{nw}, y_{nw}, x_{ne}, y_{ne}, x_{sw}, y_{sw}, x_{se}, y_{se})$$
$$h = H(X_0, X_1, x_{nw}, y_{nw}, x_{ne}, y_{ne}, x_{sw}, y_{sw}, x_{se}, y_{se})$$

(where (A( ), B( ), C( ), D( ), E( ), F( ), G( ), and H( ) are functions). In step S605, coordinates correction parameters a, b, c, d, e, f, g, and h are found by substituting the actual coordinates values for each of these functions.

The actual process of solving the simultaneous equations is now explained.

First, $$x_n = x_{ne} - x_{nw} \quad \text{[Equation 7]}$$
$$y_n = y_{ne} - y_{nw}$$
$$x_s = x_{se} - x_{sw}$$
$$y_s = y_{se} - y_{sw}$$
$$x_e = x_{se} - x_{ne}$$
$$y_e = y_{se} - y_{ne}$$
$$x_w = x_{sw} - x_{nw}$$
$$y_w = y_{sw} - y_{nw}$$
$$z_n = x_{ne}y_{ne} - x_{nw}y_{nw}$$
$$z_s = x_{se}y_{se} - x_{sw}y_{sw}$$
$$z_e = x_{se}y_{se} - x_{ne}y_{ne}$$
$$z_w = x_{sw}y_{sw} - x_{nw}y_{nw}$$

Then, $$x_v = z_s x_n - z_n x_s \quad \text{[Equation 8]}$$
$$y_v = z_s y_n - z_n y_s$$
$$z_v = x_s y_n - x_n y_s$$
$$x_h = z_e x_w - z_w x_e$$
$$y_h = z_e y_w - z_w y_e$$
$$z_h = x_e y_w - x_w y_e$$
$$y_{we} = y_w - y_e$$
$$y_{ns} = y_n - y_s$$

and, $$n_x = (X_1 - X_0) y_{ns} \quad \text{[Equation 9]}$$
$$n_y = (Y_1 - Y_0) y_{we}$$
$$m = y_v z_h - y_h z_v$$

If here $x_e = x_w$ or $y_n = y_s$, is either 0 or so close to 0 that it can not be used as a divisor.

In this situation, the nonlinear component may be almost invisible. Therefore, if $x_e = x_w$ or $y_n = y_s$ $$A(\,) = 0 \quad \text{[Equation 10]}$$
$$B(\,) = \frac{X_1 - X_0}{x_n}$$
$$C(\,) = 0$$
$$D(\,) = X_0 - x_{nw}$$
$$E(\,) = 0$$
$$F(\,) = 0$$
$$G(\,) = \frac{Y_1 - Y_0}{y_e}$$
$$H(\,) = Y_0 - y_{nw}$$

Or, if $x_e \neq x_w$ or $y_n \neq y_s$ $$A(\,) = \frac{z_h n_x}{m} \quad \text{[Equation 11]}$$
$$B(\,) = -\frac{y_h n_x}{m}$$
$$C(\,) = \frac{x_h n_x}{m}$$
$$D(\,) = X_0 - \frac{((z_h y_{nw} - y_h)x_{nw} + x_h y_{nw})n_x}{m}$$
$$E(\,) = -\frac{z_v n_y}{m}$$
$$F(\,) = \frac{y_v n_y}{m}$$
$$G(\,) = -\frac{x_v n_y}{m}$$
$$H(\,) = Y_0 + \frac{((z_v y_{nw} - y_v)x_{nw} + x_v y_{nw})n_y}{m}$$

The values of a, b, c, e, f, and g are small and demand high precision when actually solved for. Therefore if real numbers are used in the calculations of the CPU 503 or performing simultaneous calculation for high speed by 32 bit integral calculation, it is realistic to keep a, b, c, e, f, and h to approximate values of $10^4$ and to divide by the same value during correction.

Finally, in step S606, the calculated coordinates correction parameters are output to the ROM writer 507 and the process is completed. The ROM writer 507 writes the coordinates correction parameters on the unillustrated ROM attached to it. This unillustrated ROM is loaded on the coordinates input apparatus 401 after writing-in, and used to keep the coordinates correction parameters for correcting the input coordinates in the coordinates input apparatus 401.

According to the above process, merely by indicating the first through the fourth reference points on the coordinate input area of the coordinates input apparatus and inputting those coordinates, coordinates correction parameters a to h can be simply calculated and written-in on a ROM loaded on the coordinates input apparatus. In the coordinates input apparatus loaded with this ROM, the values of a to h written on the ROM are applied to the nonlinear conversion correction formulas including the quadratic term (x, y):

$$X=axy+bx+cy+d$$

$$Y=exy+fx+gy+h$$

and highly precise correction of the input coordinates can be performed even if the electrical characteristic relating to coordinates detection of the coordinates input apparatus is not linear due to the quality of the construction materials of the coordinates input apparatus by performing correction of the input coordinates by calculating the correction formulas. Thus, because the characteristic need not be linear, production costs of the coordinates input apparatus can be reduced.

Further, in the coordinates correction parameter calculation apparatus of the present embodiment, the input coordinates discrimination and storing means 402 and the parameter calculation means 407 can be realized when the CPU 503 executes; the program inside the ROM 505 and the first through the fourth coordinates keeping means 403 to 406 can be realized by the RAM 504. Therefore, the construction of the hardware of the apparatus is simple and the apparatus can be produced at low cost.

[Embodiment 3]

Figure 8:
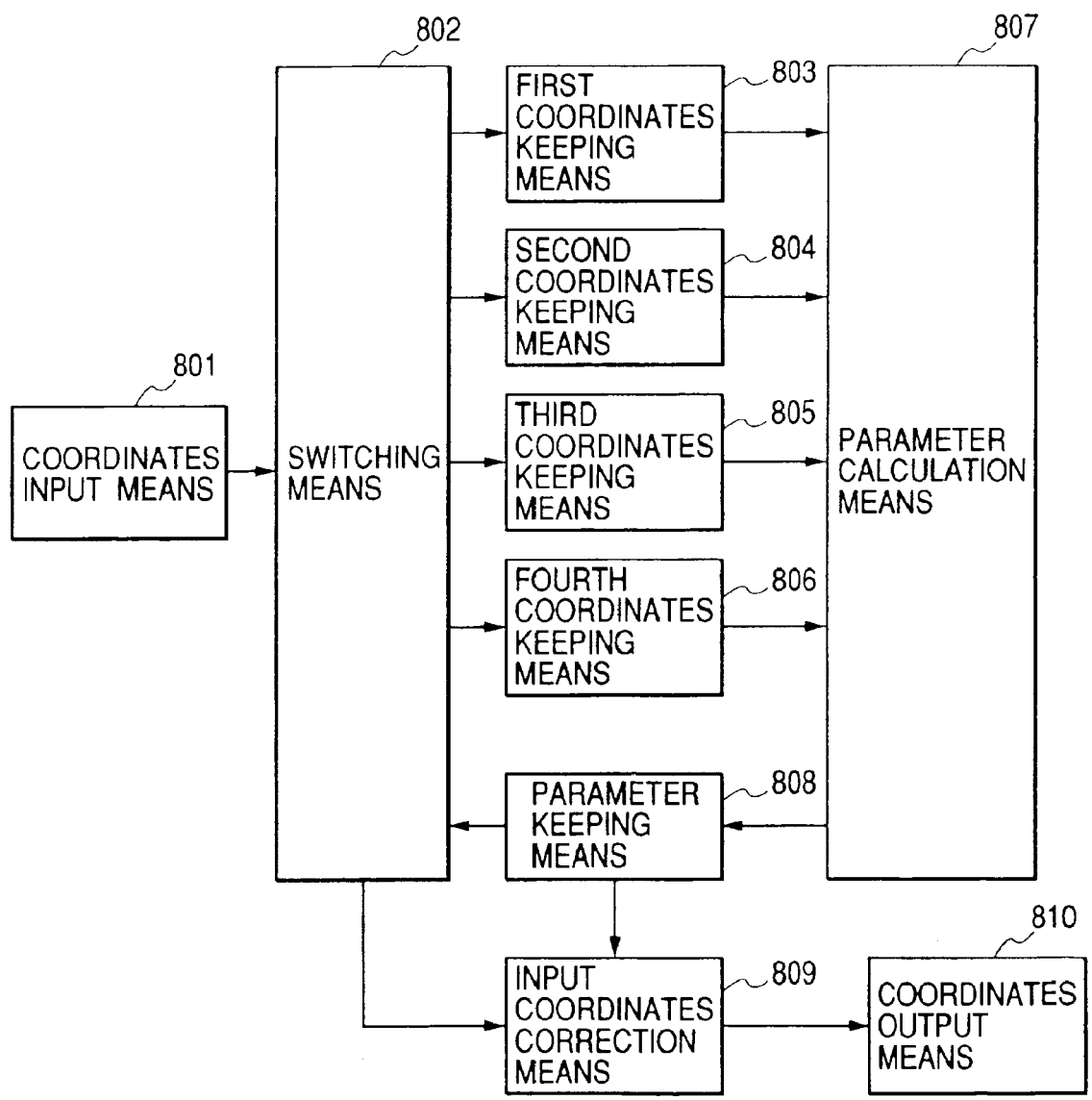
FIG. 8 is a block diagram showing the basic construction of the third embodiment of the present invention.

Next, the basic functional construction of the coordinates input apparatus of Embodiment 3 of the present invention is explained by FIG. 8. The coordinates input apparatus of Embodiment 3 having processes corresponding to the coordinates input process of Embodiment 1 and the coordinates correction parameter calculation process of Embodiment 2 are explained.

In FIG. 8, the apparatus of the present embodiment comprises a coordinates input means 801 including a coordinates input area, a switching means 802, a first through a fourth coordinates keeping means 803 to 806, a parameter calculation means 807, a parameter keeping means 808, an input coordinates correction means 809, and a coordinates output means 810.

In the coordinates input means 801, a first through a fourth reference point with differing locations are established in order to calculate coordinates correction parameters for correcting the input coordinates and the four coordinates of these points are input when the user indicates each of the reference points.

When the coordinates are input from the coordinates input area of the coordinates input means 801, the switching means 802 switches such that correction of the input coordinates input into the input coordinates correction means 809 is carried out if coordinates correction parameters are kept in the parameter keeping means 808 and calculation of coordinates correction parameters by the parameter calculation means 807 is carried out by storing the input coordinates in the first through the fourth input coordinates keeping means 803 to 806 if coordinates correction parameters are not kept.

The first through the fourth coordinates keeping means 803 to 806 are installed corresponding one to one to the first through the fourth reference points in order to keep the four input coordinates by indicating the first through the fourth reference points on the coordinates input area.

The parameter calculation means 807 calculates the coordinates correction parameters by solving simultaneous equations based on those four coordinates if the four coordinates are kept in the coordinates keeping means 803 to 806, and sends them to the parameter keeping means 808.

The parameter keeping means 808 keeps the coordinates correction parameters calculated and sent from the parameter calculation means 807.

The input coordinates correction means 809 corrects the input coordinates via the switching means 802 from the coordinates input area of the coordinates input means 801 using the coordinates correction parameters kept in the parameter keeping means 808 and sends them to the coordinates output means 810.

Figure 9:
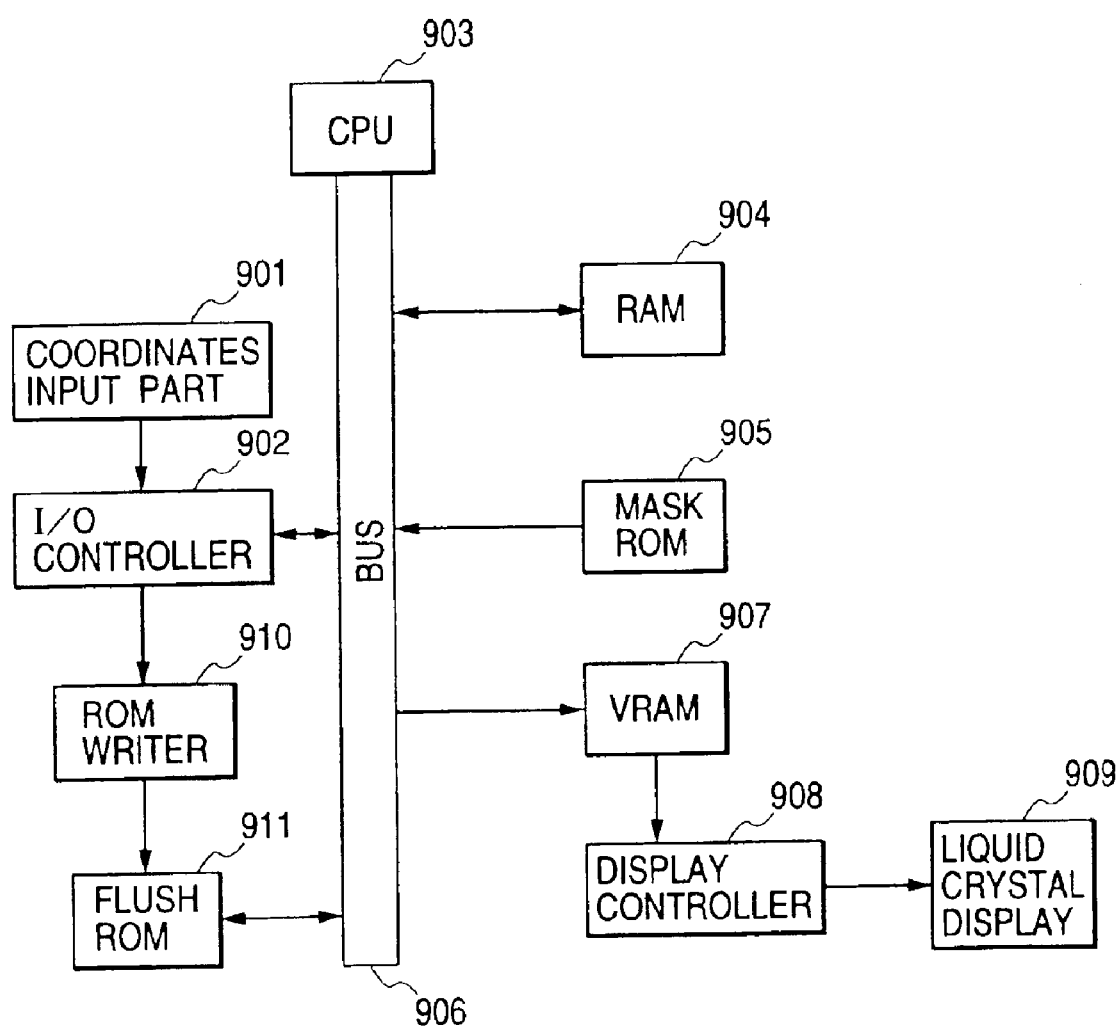
FIG. 9 is a block diagram showing the construction of the actual hardware of the third embodiment of the present invention.

Next, the actual hardware construction of the coordinates input apparatus is explained through FIG. 9.

In the construction of FIG. 9, the coordinates input part 901 is either the aforementioned resistance membrane type or another type. The coordinates data input from the coordinates input area of the coordinates input part 901 is sent to a CPU 903 via an I/O controller 902 and a bus 906. The I/O controller 902 performs transfer of the input coordinates data and the coordinates correction parameters described below under the control of the CPU 903.

The I/O controller 902, RAM 904, a mask ROM 905, VRAM 907, and a flush ROM 911 are connected via the bus 906 in the CPU 903.

The CPU 903 fulfills the role of the switching means 802, the parameter calculation means 807, and the input coordinates correction means 809 of FIG. 8 as well as performing control of the entire coordinates input apparatus by executing a control program stored in the mask ROM 905. In other words, a program for the processes to be described later in which the CPU 903 executes the switching means 802, the parameter calculation means 807, and the input coordinates correction means 809 is included in the control program stored in the mask ROM 905. The mask ROM 905 corresponds to an embodiment of the memory medium that can be read by a computer storing a control program for performing the coordinates correction process of the present invention.

RAM 904 fulfills the role of the first through the fourth coordinates keeping means 803 to 806 of FIG. 8. In other words, a first through a fourth coordinates keeping area comprising multiple addresses for keeping coordinates data corresponding one to one to the first through the fourth reference points is established within RAM 904.

Further, display data (image data) including the corrected coordinates data after the CPU 903 has corrected the input coordinates is written-in on the VRAM 907 and this data is displayed and output to a liquid crystal display 909 via the display controller 908. In other words, the coordinates output means 810 of FIG. 8 comprises VRAM 907, the display controller 908, and the liquid crystal display 909. The coordinates input area of the coordinates input part 901 is transparent and the liquid crystal display 909 is placed underneath it such that the display of the liquid crystal display 909 can be seen through the coordinates input area.

Further, the flush ROM 911 fulfills the role of the parameter keeping means 808 of FIG. 8. A ROM writer 910 is connected inside the flush ROM 911, the CPU 903 transmits the calculated coordinates correction parameters to the ROM writer 910 via the bus 906 and the I/O controller, and the ROM writer 910 writes in the coordinates correction parameters to the flush ROM 911.

Figure 10:
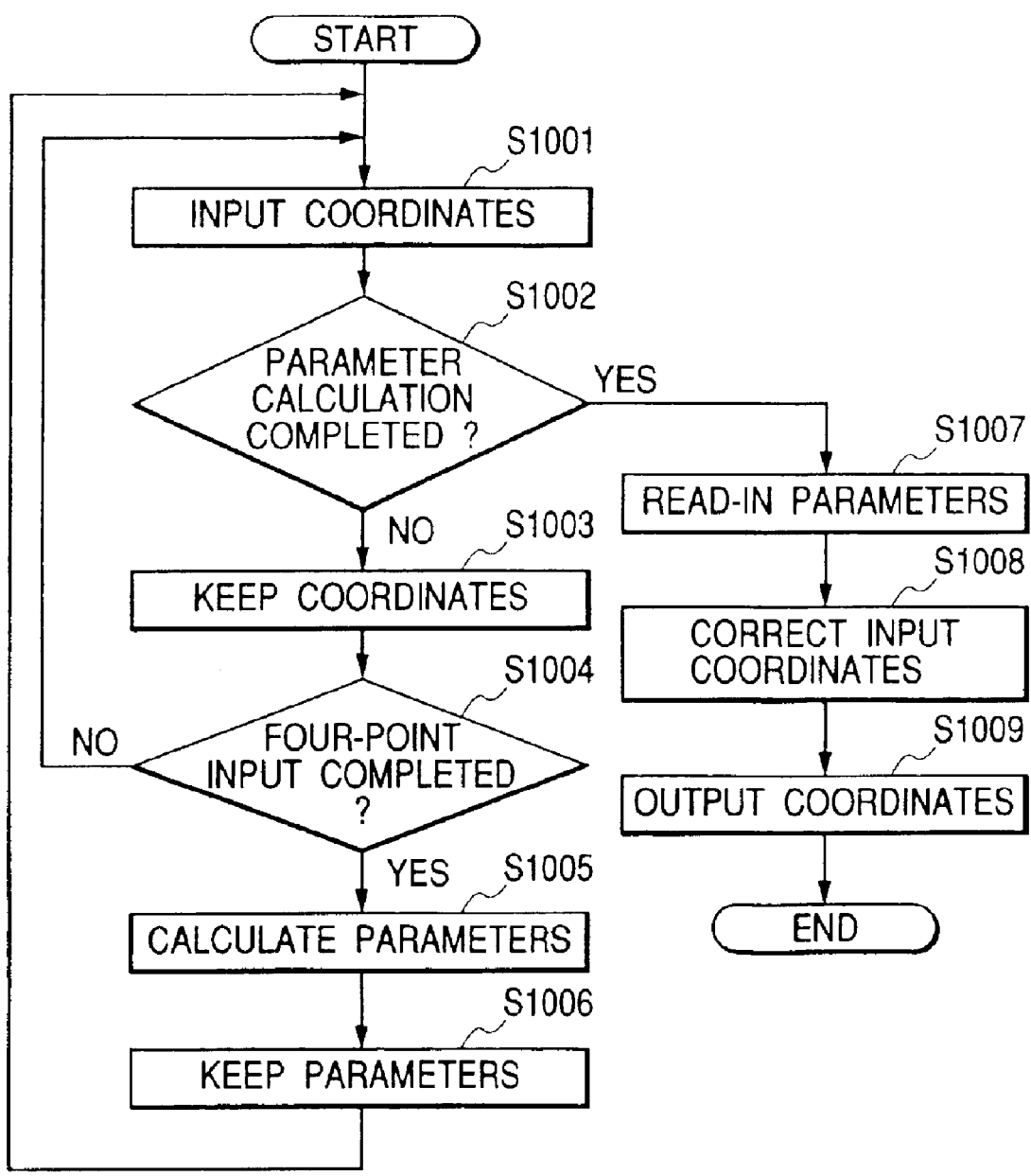
FIG. 10 is a flowchart showing the procedure of the coordinates correction process of the third embodiment.

Next, the operations of the switching means 802, the parameter calculation means 807, and the input coordinates correction means 809 performed by the CPU 903 are described by the flowchart of FIG. 10. The control program for the process procedure corresponding to the flowchart of FIG. 10 is stored in the mask ROM 905 and executed by the CPU 903.

In the third embodiment, in order to perform calculation of the coordinates correction parameters, four coordinates are input when the operator of the apparatus indicates a first through a fourth reference point with differing locations established on the coordinates input area of the coordinates input apparatus 1.

In order to do so, as shown in FIG. 7, a first through a fourth reference point mark 703 to 706 representing the first through the fourth reference point with differing locations are displayed in advance on the coordinates input area 702 of the coordinates input apparatus, and these are indicated (contacted) by a coordinates input indication tool in the form of a pen, for example. The coordinates of these marks 703 to 706, or in other words the coordinates of the locations of the first through the fourth reference points become the coordinates for reference in the parameter calculations described below. Therefore they should be established with a suitable distance between them such that rounding-off errors during calculation are not too large. In order to simplify the calculation here, the coordinates of the locations of the reference point marks 703 to 706 are given as four coordinates expressed in pairs of two X coordinates and two Y coordinates $(X_0, Y_0), (X_1, Y_0), (X_0, Y_1)$, and $(X_1, Y_1)$. These marks 703 to 706 are displayed by the liquid crystal display 909.

In the process in FIG. 10, first the first through fourth coordinates input is performed from the coordinates input area of the coordinates input means 801 by the user in step S1001. Next it moves to step S1002. Steps S1002, S1003, and S1004 serve as the switching means 802.

In step S1002, it is; determined whether or not calculation of the coordinates correction parameters is completed, in other words, whether or not coordinates correction parameters have already been written in to the parameter keeping means 808 (the flush ROM 911) and kept, and moves to step S1003 if they are not kept. In this case, the coordinates input in step S1001 are considered to be the coordinates input corresponding to one of the first through the fourth reference points for coordinates correction parameter calculation and the process below step S1003 is performed.

In step S1003, the coordinates (x, y) input in step S1001 are determined to correspond to one of either the first through the fourth reference points indicated by the reference point marks 703 to 706 and the input coordinates (x, y) data is stored in one area corresponding to the reference point as a result of the above determination among the first through the fourth coordinates keeping areas in RAM 904. For example, if it is determined that the input coordinates correspond to the first reference point, the input coordinates data are stored in the first coordinates keeping area corresponding to the first reference point.

The above determination is decided by calculating the respective distances between the input coordinates (x, y) and the original coordinates $(X_0, Y_0), (X_1, Y_0), (X_0, Y_1)$, and $(X_1, Y_1)$ of each of the four reference points and comparing those distances. The input coordinates are determined to correspond to the reference point the smallest distance away.

At this time, the liquid crystal display 909 may be controlled such that the reference marks 703 to 706 displayed disappear as the corresponding reference points are entered. By doing so, it is easier for the user to understand which of the reference points has been input among the four points.

Next, in step S1004 it is determined whether or not all coordinates have been input corresponding to the four reference points 703 to 706 and the storage of the input coordinates to the first through the fourth coordinates keeping areas in RAM 904 has been completed. If it has not been completed it returns to step S1001 and repeats the step S1001 to S1004 process; if it has been completed it advances to S1005.

Here the input coordinates corresponding to the four reference point marks 703 to 706 are respectively $(x_{nw}, y_{nw})$, $(x_{ne}, y_{ne})$, $(x_{sw}, y_{sw})$, and $(x_{se}, y_{se})$. The subscripts of each coordinate nw, ne, sw, and se mean respectively northwest, northeast, southwest and southeast. In other words, they express the direction of the location of the reference points from the center of the coordinates input area of the coordinates input apparatus if north is the upward direction.

In step S1005 a process is performed as the parameter calculation means 807. In other words, the parameters for correcting the input coordinates are calculated by solving the simultaneous equations based on the four coordinates $(x_{nw}, y_{nw}), (x_{ne}, y_{ne}), (x_{sw}, y_{sw})$, and $(x_{se}, y_{se})$ stored in the first through the fourth coordinates keeping areas in the RAM 904 input as above.

Here the formulas below are the simultaneous equations based on the four coordinates. As for the basic correction formula for coordinates correction, if the corrected coordinates are (X, Y), then in a nonlinear conversion formula including the quadratic term (xy) (where a, b, c, d, e, f, g, and h are constants):

$$X = axy + bx + cy + d$$

$$Y = exy + fx + gy + h$$

When the input coordinates of the four reference points above are applied, the following simultaneous equations are formed:

$$X_0 = ax_{nw}y_{nw} + bx_{nw} + cy_{nw} + d \quad \text{[Equation 12]}$$
$$Y_0 = ex_{nw}y_{nw} + fx_{nw} + gy_{nw} + h$$
$$X_1 = ax_{ne}y_{ne} + bx_{ne} + cy_{ne} + d$$
$$Y_0 = ex_{ne}y_{ne} + fx_{ne} + gy_{ne} + h$$
$$X_0 = ax_{sw}y_{sw} + bx_{sw} + cy_{sw} + d$$
$$Y_1 = ex_{sw}y_{sw} + fx_{sw} + gy_{sw} + h$$
$$X_1 = ax_{se}y_{se} + bx_{se} + cy_{se} + d$$
$$Y_1 = ex_{se}y_{se} + fx_{se} + gy_{se} + h$$

Solving these equations the following is expressed as functions:

$$a = A(X_0, X_1, x_{nw}, y_{nw}, x_{ne}, y_{ne}, x_{sw}, y_{sw}, x_{se}, y_{se})$$ [Equation 13]

$$b = B(X_0, X_1, x_{nw}, y_{nw}, x_{ne}, y_{ne}, x_{sw}, y_{sw}, x_{se}, y_{se})$$

$$c = C(X_0, X_1, x_{nw}, y_{nw}, x_{ne}, y_{ne}, x_{sw}, y_{sw}, x_{se}, y_{se})$$

$$d = D(X_0, X_1, x_{nw}, y_{nw}, x_{ne}, y_{ne}, x_{sw}, y_{sw}, x_{se}, y_{se})$$

$$e = E(X_0, X_1, x_{nw}, y_{nw}, x_{ne}, y_{ne}, x_{sw}, y_{sw}, x_{se}, y_{se})$$

$$f = F(X_0, X_1, x_{nw}, y_{nw}, x_{ne}, y_{ne}, x_{sw}, y_{sw}, x_{se}, y_{se})$$

$$g = G(X_0, X_1, x_{nw}, y_{nw}, x_{ne}, y_{ne}, x_{sw}, y_{sw}, x_{se}, y_{se})$$

$$h = H(X_0, X_1, x_{nw}, y_{nw}, x_{ne}, y_{ne}, x_{sw}, y_{sw}, x_{se}, y_{se})$$

(where (A( ), B( ), C( ), D( ), E( ), F( ), G( ), and H( ) are functions). In step S1005, the coordinates correction parameters a, b, c, d, e, f, g, and h are sought by substituting the actual coordinate values for each of these functions.

Now the actual process of solving the simultaneous equations is explained. First:

$$x_n = x_{ne} - x_{nw}$$ [Equation 14]
$$y_n = y_{ne} - y_{nw}$$
$$x_s = x_{se} - x_{sw}$$
$$y_s = y_{se} - y_{sw}$$
$$x_e = x_{se} - x_{ne}$$
$$y_e = y_{se} - y_{ne}$$
$$x_w = x_{sw} - x_{nw}$$
$$y_w = y_{sw} - y_{nw}$$
$$z_n = x_{ne}y_{ne} - x_{nw}y_{nw}$$
$$z_s = x_{se}y_{se} - x_{sw}y_{sw}$$
$$z_e = x_{se}y_{se} - x_{ne}y_{ne}$$
$$z_w = x_{sw}y_{sw} - x_{nw}y_{nw}$$

Then, $$x_v = z_s x_n - z_n x_s$$ [Equation 15]
$$y_v = z_s y_n - z_n y_s$$
$$z_v = x_s y_n - x_n y_s$$
$$x_h = z_e x_w - z_w x_e$$
$$y_h = z_e y_w - z_w y_e$$
$$z_h = x_e y_w - x_w y_e$$
$$y_{we} = y_w - y_e$$
$$y_{ns} = y_n - y_s$$

and, $$n_x = (X_1 - X_0)y_{ns}$$ [Equation 16]
$$n_y = (Y_1 - Y_0)y_{we}$$
$$m = y_v z_h - y_h z_v$$

If xe=xw or yn=ys, then m will be 0 or so close to 0 that m can not be used as a divisor.

In this situation the nonlinear component may be almost invisible. Therefore if xe=xw or yn=ys:

$$A( ) = 0$$ [Equation 17]
$$B( ) = \frac{X_1 - X_0}{x_n}$$
$$C( ) = 0$$
$$D( ) = X_0 - x_{nw}$$
$$E( ) = 0$$
$$F( ) = 0$$
$$G( ) = \frac{Y_1 - Y_0}{y_e}$$
$$H( ) = Y_0 - y_{nw}$$

If xe≠xw and yn≠ys, then the parameters can be found by:

$$A( ) = \frac{z_h n_x}{m}$$ [Equation 18]
$$B( ) = -\frac{y_h n_x}{m}$$
$$C( ) = \frac{x_h n_x}{m}$$
$$D( ) = X_0 - \frac{((z_h y_{nw} - y_h)x_{nw} + x_h y_{nw})n_x}{m}$$
$$E( ) = -\frac{z_v n_y}{m}$$
$$F( ) = \frac{y_v n_y}{m}$$
$$G( ) = -\frac{x_v n_y}{m}$$
$$H( ) = Y_0 + \frac{((z_v y_{nw} - y_v)x_{nw} + x_v y_{nw})n_y}{m}$$

When actually solving the equations, because the values of a, b, c, e, f, and g are small and high precision is demanded, if using real numbers in the calculations of the CPU 503 or performing simultaneous calculation for high speed by 32 bit integral calculation, it is realistic to keep a, b, c, e, f, and h are kept as approximate values of $10^4$ and to divide by the same value during correction.

Next, in step S1006, the calculated coordinates correction parameters are output to the ROM writer 910, written in the flush ROM 911 and kept. When step S1006 is completed it returns to step S1001.

When the calculation of the coordinates correction parameters in step S1002 is completed, in other words when it is determined that the coordinates correction parameters are already written in and kept in the flush ROM 910 as the parameter keeping means 1008, it moves to step S1007. In this case, it performs the processes from step S1007 and following, deciding that the coordinates input of step S1001 is not input for coordinates correction parameter calculation but for performing normal functions.

Steps S1007 and S1008 perform their processes as the input coordinates correction means. In other words, first the coordinates correction parameters a, b, c, d, e, f, g, and h are read from the flush ROM 911 in step S1007.

Next, correction of the input coordinates is performed in step S1008 using the parameters read as above. Here the corrected coordinates (X, Y) are found by substituting the values of the read parameters a to h for the input coordinates (x, y) in the basic correction formula given above:

$$X = axy + bx + cy + d$$

$$Y = exy + fx + gy + h$$

Next, in step S1009 the corrected coordinates data (X, Y) is written in VRAM 907 as display data and displayed and output to the liquid crystal display 909 via the display controller 908. Thus the process is completed.

By performing the above flowchart operations, the coordinates correction parameters are calculated and kept, the input coordinates are corrected using these parameters, and the function of the coordinates input apparatus can be fulfilled.

Here, the operations the operator of the apparatus performs in order to calculate the coordinates correction parameters are extremely simple, being merely to indicate (contact) each of the four reference point marks 703 to 706 displayed on the coordinates input area 702 of the apparatus with a coordinates input indication tool in the form of a pen, for example. The coordinates correction parameters a, b, c, d, e, f, g, and h can be calculated as constants of the nonlinear conversion formulas including the quadratic term (xy):

$$X=axy+bx+cy+d$$
$$Y=exy+fx+gy+h$$

based on the simple coordinates input.

Thus, because correction of the input coordinates is performed by these nonlinear conversion formulas, even if the electrical characteristic relating to the coordinates detection is not linear due to the quality of the parts of the coordinates input means 801 for example, accurate correction can be performed in response and the coordinates input can be performed with high precision. Further, because the electrical characteristic of the coordinates detection of the coordinates input means 801 does not have to be linear, the production costs of the apparatus can be reduced.

[Embodiment 4]

The coordinates input apparatus of the above first through the third embodiments can use a portable information processing apparatus such as a Personal Digital Assistant (PDA) or a notebook personal computer.

Figure 11:
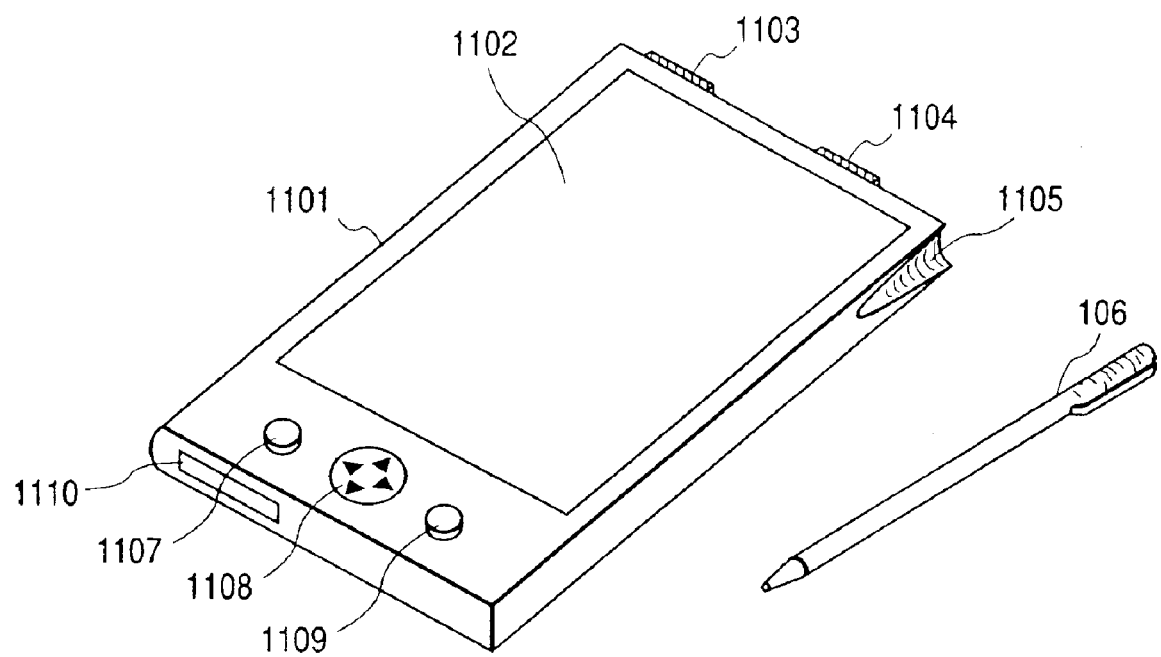
FIG. 11 is a drawing showing one form of a portable information processing apparatus possible as an embodiment of the present invention.

FIG. 11 shows one embodiment of a portable information processing apparatus.

The portable information processing apparatus of FIG. 11 comprises a display part 1102 such as a liquid crystal display doubling as the coordinates input part, interfaces with an external apparatus (wireless communication interfaces such as an IrDA or wire communication interfaces such as an RS-422) 1103 and 1104, a coordinates input indication pen 1106, a storage part 1105 for storing the coordinates input indication pen in the main body, buttons 1107 to 1109 used as directional keys or decision buttons, and a memory medium slot 1110 for a memory medium such as a flush memory or a floppy disk.

Reference point marks such as those shown in FIG. 7 are displayed on the display part 1102 of the portable information processing apparatus 1101 and the processes indicated in Embodiments 1 to 3 can be performed by indicating these reference point marks with the coordinates input indication pen 1106.

A program corresponding to each of the flowcharts shown in Embodiments 1 to 3 can also be stored in advance in the memory medium housed in the portable information processing apparatus 1101 or the program can be executable by attaching a memory medium holding the program to the memory medium slot 1110. Further, the program can be executable supplied from an external apparatus through the interface 1103 (or 1104). In this case, the external apparatus (sending apparatus) which sends the program comprises the present invention because the supplied program itself is the embodiment.

Figure 12:
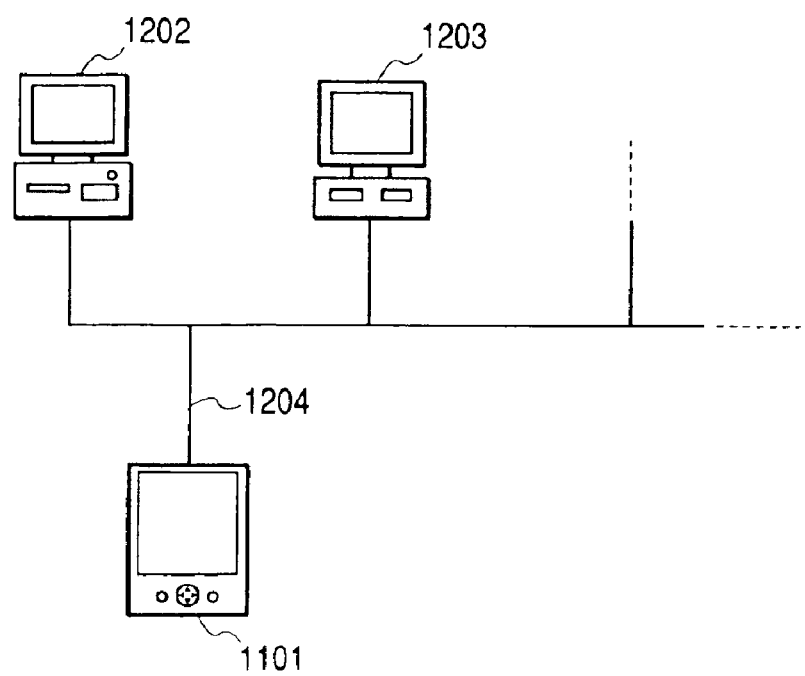
FIG. 12 is a drawing showing that the portable information processing apparatus possible as an embodiment of the present invention can be connected to an external device through a network.

The portable information processing apparatus 1101 can be connected to an external apparatus using the interfaces 1103 or 1104 with an external apparatus. FIG. 12 shows one embodiment of connection with an external apparatus.

In FIG. 12, the portable information processing apparatus 1101 can be connected to information processing apparatuses 1202 and 1203 such as personal computers through a wireless or wire network 1204.

Further, the information processing apparatus 1202 (or 1203) can be used as the coordinates correction parameter calculation apparatus. In this case, the information processing apparatus 1202 is made such that it can receive the coordinates input from the portable information processing apparatus 1101 through the network or such, calculate the coordinates correction parameters, and store them on a flush ROM or the like (not shown in the Figure) within the portable information processing apparatus 1101 again through the network or the like. The information processing apparatus 1202 could also be made to store the calculated coordinates correction parameters in a memory medium such as a flush memory and supply the coordinates correction parameters to the portable information processing apparatus 1101 by attaching the memory medium to the memory medium slot 1110.

As is clear from the above description, according to the Embodiments 1 to 4, in a coordinates correction apparatus, a coordinates correction method, and a memory medium that can be read by a computer storing a control program for the coordinates correction process, quadratic nonlinear conversion constants are kept as parameters for correcting input coordinates, and the input coordinates are corrected by the quadratic nonlinear conversion using these parameters, so that even if the coordinates detection characteristic is not linear due to such factors as the quality of the parts of the coordinates input part of the coordinates input apparatus, correction of the input coordinates can be accurately performed in response and highly precise coordinates input can be performed.

Further, according to the Embodiments 1 to 4, calculation of coordinates correction parameters for performing highly precise correction of input coordinates can be performed with a simple, low-cost construction even if the electrical characteristic of the coordinates detection of the coordinates input apparatus is not linear, and as a result the production costs of the coordinates input apparatus for performing correction of input coordinates using the calculated coordinates correction parameters can be reduced.

Further, according to Embodiments 1 to 4, coordinates correction parameters can be calculated as nonlinear conversion correction formula constants based on simple coordinates input merely by indicating four reference points established on a coordinates input area.

Further, by performing correction of input coordinates with nonlinear conversion correction formulas using the calculated coordinates correction parameters, even if the electrical characteristic of the coordinates detection of the coordinates input part is not linear, suitable correction of the user's input and highly precise coordinates input can be performed. The production costs of the device can be further reduced.

What is claimed is:

1. A coordinates correction apparatus comprising:
   coordinate input means being placed on a display unit;
   display control means for controlling display of a plurality of reference points on the display unit, the reference points indicating positions for use in calculating coordinates correction parameters, wherein said coordinate input means inputs a coordinate corresponding to one of the displayed reference points based on a user designation;
   coordinate reception means for receiving the coordinate input by said coordinate input means corresponding to the one of the displayed reference points;
   discriminating means for discriminating, among the displayed reference points, a reference point corresponding to the coordinate received by said coordinate reception means;

coordinates keeping means for keeping the coordinate receiving by said coordinate reception means as the coordinate corresponding to the reference point discriminated by said discriminating means;

repeating means for repeating processes of said display control means, said coordinate reception means, said discriminating means and said coordinates keeping means to obtain coordinates for remaining reference points for which a coordinate is not kept by said coordinates keeping means, wherein said display control means is controlled to display only the remaining reference points;

parameter calculation means for calculating coordinates correction parameters for nonlinear conversion, based on the coordinates kept by said coordinate keeping means;

parameter keeping means for keeping the calculated coordinates correction parameters for nonlinear conversion; and coordinates correction means for correcting the coordinates input via said coordinates input means by the nonlinear conversion using the calculated coordinates correction parameters.

2. The coordinates correction apparatus of claim 1, wherein the coordinates correction parameters are a, b, c, d, e, f, g, and h and wherein the nonlinear conversion for correcting the coordinates (x, y) input via the coordinates input means to corrected coordinates (X, Y) is expressed by:

$$X=axy+bx+cy+d$$

$$Y=exy+fx+gy+h.$$

3. The coordinates correction apparatus of claim 1, further comprising a coordinates output means for outputting the coordinates corrected by the coordinates correction means.

4. The coordinates correction apparatus of claim 1, wherein the parameter calculation means calculates the coordinates correction parameters for the nonlinear conversion based on the coordinates kept for all of the plurality of reference points.

5. The coordinates correction apparatus of claim 1, wherein the parameter calculation means calculates the coordinates correction parameters by solving simultaneous equations based on the kept coordinates corresponding to the plurality of displayed reference points.

6. The coordinates correction apparatus of claim 1, wherein said display is a liquid crystal display.

7. The coordinates correction apparatus of claim 1, wherein the plurality of displayed reference points is four reference points expressed in pairs of two x coordinates and two y coordinates in an xy rectangular coordinates system.

8. The coordinates correction apparatus of claim 7, wherein the parameter calculation means calculates the coordinates correction parameters a, b, c, d, e, f, g, and h by solving the following formulas where the coordinates of the four reference points as $(X_0, Y_0)$, $(X_1, Y_0)$, $(X_0, Y_1)$, and $(X_1, Y_1)$, setting the received coordinates as $(x_{nw}, y_{nw})$, $(x_{ne}, y_{ne})$, $(x_{sw}, y_{sw})$, and $(x_{se}, y_{se})$;

$$X_0 = ax_{nw}y_{nw} + bx_{nw} + cy_{nw} + d$$

$$Y_0 = ex_{nw}y_{nw} + fx_{nw} + gy_{nw} + h$$

$$X_1 = ax_{ne}y_{ne} + bx_{ne} + cy_{ne} + d$$

$$Y_0 = ex_{ne}y_{ne} + fx_{ne} + gy_{ne} + h$$

$$X_0 = ax_{sw}y_{sw} + bx_{sw} + cy_{sw} + d$$

$$Y_1 = ex_{sw}y_{sw} + fx_{sw} + gy_{sw} + h$$

$$X_1 = ax_{se}y_{se} + bx_{se} + cy_{se} + d$$

$$Y_1 = ex_{se}y_{se} + fx_{se} + gy_{se} + h,$$

wherein the parameter keeping means keeps the calculated coordinates correction parameters a, b, c, d, e, f, g, and h, and wherein the coordinates correction means corrects the coordinates input via said coordinate input means (x, y) to corrected coordinates (X, Y) by the nonlinear conversion $$X=axy+bx+cy+d$$

$$Y=exy+fx+gy+h.$$

9. The coordinates correction apparatus of claim 1, further comprising a deciding means for deciding to control reference point display using said display control means, to receive coordinates using said coordinates reception means, to discriminate using said discriminating means, to keep user-designated coordinates using said coordinates keeping means and to calculate coordinates correction parameters using said parameter calculation means in a case that said parameter keeping means does not keep the coordinates correction parameters.

10. The coordinates correction apparatus of claim 1, wherein the coordinates correction apparatus is a portable information processing apparatus.

11. The coordinates correction apparatus of claim 1, wherein the coordinates correction apparatus can be connected to a network.

12. The coordinate correction apparatus according to claim 1, wherein said display control means causes the displayed reference point to disappear as said coordinates reception means receives the coordinates corresponding to the reference point.

13. A coordinates correction method for controlling a coordinates correction apparatus which has a coordinate input means placed on a display unit, the method comprising:

controlling display of a plurality of reference points on the display unit, the reference points indicating positions for use in calculating coordinates correction parameters, wherein said coordinate input means inputs a coordinate corresponding to one of the displayed reference points based on an user designation;

receiving the coordinate input by said coordinate input means corresponding to the one of the displayed reference points;

discriminating, among the displayed reference points, a reference point corresponding to the coordinate received in said receiving step;

keeping the coordinate received in said receiving step as the coordinate corresponding to the reference point discriminated in said discriminating step as the coordinate corresponding to the reference point discriminated in said discriminating step;

repeating said display controlling, receiving, discriminating and keeping steps to obtain coordinates for remaining reference points for which a coordinate is not kept in said keeping step, wherein said display controlling step controls display of reference points to display only the remaining reference points;

calculating coordinates correction parameters for nonlinear conversion, based on the coordinates kept in said step of keeping user-designated coordinate;

keeping the calculated coordinates correction parameters for nonlinear conversion; and correcting the coordinates input in the coordinates receiving step by the nonlinear conversion using the calculated coordinates correction parameters.

14. The coordinates correction method of claim 13, wherein the coordinates correction parameters are a, b, c, d, e, f, g, and h, and wherein the nonlinear conversion for correcting the coordinates (x, y) input via the coordinates receiving step to the corrected coordinates (X, Y) in said coordinates correction step is represented by $$X = axy + bx + cy + d$$
$$Y = exy + fx + gy + h.$$

15. The coordinates correction method of claim 13, further comprising a coordinates output step of outputting the coordinates corrected in the coordinates correction step.

16. The coordinates correction method of claim 13, wherein the coordinates correction parameters for the nonlinear conversion based on the coordinates kept for all of the plurality of reference points are calculated in said step of calculating coordinates correction parameters.

17. The coordinates correction method of claim 13, wherein said step of calculating coordinates correction parameter is executed by solving simultaneous equations based on the kept coordinates corresponding to the plurality of displayed reference points.

18. The coordinates correction method of claim 13, wherein said display is liquid crystal display.

19. The coordinates correction method of claim 13, wherein the plurality of displayed reference points is four reference points expressed in pairs of two x coordinates and two y coordinates in an xy rectangular coordinates system.

20. The coordinates correction method of claim 19, wherein coordinates correction parameters, a, b, c, d, e, f, g, and h, are calculated in the parameter calculation step by solving the following formulas where the coordinates of the four reference points as $(X_0, Y_0)$, $(X_1, Y_0)$, $(X_0, Y_1)$, and $(X_1, Y_1)$, setting the received coordinates as $(x_{nw}, y_{nw})$, $(x_{ne}, y_{ne})$, $(x_{sw}, y_{sw})$, and $(x_{se}, y_{se})$:

$$X_0 = ax_{nw}y_{nw} + bx_{nw} + cy_{nw} + d$$
$$Y_0 = ex_{nw}y_{nw} + fx_{nw} + gy_{nw} + h$$
$$X_1 = ax_{ne}y_{ne} + bx_{ne} + cy_{ne} + d$$
$$Y_0 = ex_{ne}y_{ne} + fx_{ne} + gy_{ne} + h$$
$$X_0 = ax_{sw}y_{sw} + bx_{sw} + cy_{sw} + d$$
$$Y_1 = ex_{sw}y_{sw} + fx_{sw} + gy_{sw} + h$$
$$X_1 = ax_{se}y_{se} + bx_{se} + cy_{se} + d$$
$$Y_1 = ex_{se}y_{se} + fx_{se} + gy_{se} + h,$$

wherein the calculated coordinates correction parameters are kept in the parameter keeping step, and wherein the coordinates input via said coordinates receiving step (x, y) are corrected to corrected coordinates (X, Y) in the coordinates correction steps by the nonlinear conversion $$X = axy + bx + cy + d$$
$$Y = exy + fx + gy + h.$$

21. The coordinates correction method of claim 13, further comprising deciding to perform said steps of controlling display of a plurality of reference points, receiving coordinates, discriminating which reference point corresponds to the user-designated coordinate, keeping the user-designated coordinate and calculating coordinates correction parameters in a case that said step of keeping calculated coordinates correction parameters does not keep the coordinates correction parameters.

22. The coordinates correction method of claim 13 which is a coordinates correction method for controlling a portable information processing apparatus.

23. The coordinate correction method of claim 13, wherein said controlling display of a plurality of reference points on the display further comprises causing the displayed reference points to disappear as the coordinates corresponding to the reference point are received by said receiving coordinates step.

24. A computer-readable memory medium for storing a coordinates correction control program for controlling a coordinates correction apparatus which has a coordinate input means placed on a display unit, execution steps of the program comprising:

controlling display of a plurality of reference points on the display unit, the reference points indicating positions for use in calculating coordinates correction parameters, wherein said coordinate input means inputs a coordinate corresponding to one of the displayed reference points based on an user designation;

receiving the coordinate input by said coordinate input means for the displayed reference points;

discriminating, among the displayed reference points, a reference point corresponding to the coordinate received in said receiving coordinates step;

keeping the coordinate receiving in said coordinate receiving step as the coordinate corresponding to the reference point discriminated in said discriminating step;

repeating said display controlling, receiving, discriminating and keeping steps to obtain coordinates for remaining reference points for which a coordinate is not kept in said keeping step, wherein said display controlling step controls display of reference points to display only the remaining reference points;

calculating coordinates correction parameters for nonlinear conversion, based on the coordinates kept in said step of keeping user-designated coordinates;

keeping the calculated coordinates correction parameters for nonlinear conversion; and correcting the coordinates input in the coordinates receiving step by the nonlinear conversion using the calculated coordinates correction parameters.

25. The computer-readable memory medium of claim 24, wherein the coordinates correction parameters are a, b, c, d, e, f, g, and h, and wherein the nonlinear conversion for correcting the coordinates (x, y) input via the coordinates receiving step to the corrected coordinates (X, Y) in said coordinates correction step is represented by $$X = axy + bx + cy + d$$
$$Y = exy + fx + gy + h.$$

26. The computer-readable memory medium of claim 24, further comprising outputting coordinates corrected in said coordinates correction step.

27. The computer-readable memory medium for storing a coordinates correction control program of claim 24, wherein the coordinates correction parameters for the nonlinear conversion based on the coordinates kept for all of the plurality of reference points are calculated in said calculating coordinates correction parameters.

28. The computer-readable memory medium of claim 24, wherein said calculating coordinates correction parameter is executed by solving simultaneous equations based on the kept coordinates corresponding to the plurality of displayed reference points.

29. The computer-readable memory medium of claim 24, wherein said display is liquid crystal display.

30. The computer-readable memory medium of claim 24, wherein the plurality of displayed reference points is four reference points expressed in pairs of two x coordinates and two y coordinates in an xy rectangular coordinates system.

31. The computer-readable memory medium of claim 30, wherein coordinates correction parameters, a, b, c, d, e, f, g, and h, are calculated in the parameter calculation step by solving the following formulas where the coordinates of the four reference points as $(X_0, Y_0)$, $(X_1, Y_0)$, $(X_0, Y_1)$, and $(X_1, Y_1)$, setting the received coordinates as $(x_{nw}, y_{nw})$, $(x_{ne}, y_{ne})$, $(x_{sw}, y_{sw})$, and $(x_{se}, y_{se})$:

$$X_0 = ax_{nw}y_{nw} + bx_{nw} + cy_{nw} + d$$
$$Y_0 = ex_{nw}y_{nw} + fx_{nw} + gy_{nw} + h$$
$$X_1 = ax_{ne}y_{ne} + bx_{ne} + cy_{ne} + d$$
$$Y_0 = ex_{ne}y_{ne} + fx_{ne} + gy_{ne} + h$$
$$X_0 = ax_{sw}y_{sw} + bx_{sw} + cy_{sw} + d$$
$$Y_1 = ex_{sw}y_{sw} + fx_{sw} + gy_{sw} + h$$

-continued
$$X_1 = ax_{se}y_{se} + bx_{se} + cy_{se} + d$$
$$Y_1 = ex_{se}y_{se} + fx_{se} + gy_{se} + h,$$

wherein the calculated coordinates correction parameters are kept in the parameter keeping step, and wherein the coordinates input via said coordinates receiving step (x, y) are corrected to corrected coordinates (X, Y) in the coordinates correction steps by the nonlinear conversion $$X=axy+bx+cy+d$$

$$Y=exy+fx+gy+h.$$

32. The computer-readable memory medium of claim 24, further comprising deciding to execute said display controlling step, said coordinates receiving step, and said parameter calculation step if said keeping step does not keep the coordinates correction parameters.

33. The computer-readable memory medium of claim 24, wherein the program is a coordinates correction program for controlling a portable information processing apparatus.

34. The computer readable memory medium of claim 24, wherein said controlling display of a plurality of reference points on the display further comprises causing the displayed reference points to disappear as the coordinates corresponding to the reference point are received by said receiving coordinates step.

* * * * *

UNITED STATES PATENT AND TRADEMARK OFFICE
CERTIFICATE OF CORRECTION

PATENT NO. : 7,012,199 B2
APPLICATION NO. : 09/454969
DATED : March 14, 2006
INVENTOR(S) : Ryoji Fukuda It is certified that error appears in the above-identified patent and that said Letters Patent is hereby corrected as shown below:

COLUMN 2:

Line 17, "in incline" should read --an incline--; and
Line 64, "X=ax+by=C" should read --X=ax+by+c--.

COLUMN 4:

Line 51, "fist" should read --first--.

COLUMN 5:

Line 60, "roll" should read --role--.

COLUMN 8:

Line 50, "coordinates;" should read --coordinates--.

COLUMN 9:

Line 12, "in put" should read --input--;
Line 16, "coordinate," should read --coordinates,--; and
Line 62, "(A( )," should read --A( ),--.

COLUMN 10:

Line 5, "$y_s=y_{se}-s_{sw}$" should read --$y_s=y_{se}-y_{sw}$--;
Line 29, "is" should read --m is--.

COLUMN 11:

Line 38, "executes;" should read --executes--.

COLUMN 13:

Line 47, "is;" should read --is--.

COLUMN 15:

Line 17, "(A( )," should read --A( ),--.

UNITED STATES PATENT AND TRADEMARK OFFICE
CERTIFICATE OF CORRECTION

PATENT NO. : 7,012,199 B2
APPLICATION NO. : 09/454969
DATED : March 14, 2006
INVENTOR(S) : Ryoji Fukuda It is certified that error appears in the above-identified patent and that said Letters Patent is hereby corrected as shown below:

COLUMN 16:

Line 32, "are kept" should be deleted.

COLUMN 20:

Line 38, "coordinate" should read --coordinates--; and
    Line 52, "an" should read --a--.

COLUMN 21:

Line 31, "parameter" should read --parameters--.

COLUMN 22:

Line 14, "coordinate" should read --coordinates--;
    Line 31, "an" should read --a--; and
    Line 37, "receiving" should read --received--.

COLUMN 23:

Line 13, "liquid" should read --a liquid--.

COLUMN 24:

Line 27, "computer readable" should read --computer-readable--.

Signed and Sealed this

Seventeenth Day of June, 2008

JON W. DUDAS
*Director of the United States Patent and Trademark Office*